United States Patent [19]
Uhl

[11] 3,804,273
[45] Apr. 16, 1974

[54] CATALYST DISTRIBUTION APPARATUS
[75] Inventor: George A. Uhl, Markham, Ill.
[73] Assignee: Atlantic Richfield Company, New York, N.Y.
[22] Filed: June 16, 1972
[21] Appl. No.: 263,535

[52] U.S. Cl............ 214/17 CB, 23/288 R, 239/666, 239/684, 239/687
[51] Int. Cl............................................. B65g 65/30
[58] Field of Search ........... 239/666, 684, 687, 682, 239/688; 214/17 CB; 23/288 R; 222/410

[56] References Cited
UNITED STATES PATENTS

| 3,064,833 | 11/1962 | Von Ruden | 239/684 X |
| 1,245,250 | 11/1917 | McGee | 239/682 |
| 3,371,870 | 3/1968 | Harrer | 239/687 X |
| 1,800,298 | 4/1931 | Koch | 239/687 |
| 1,132,053 | 3/1915 | Watts | 239/687 |
| 699,004 | 4/1902 | O'Neil | 239/688 X |
| 2,687,892 | 8/1954 | Kinsella | 239/684 X |

OTHER PUBLICATIONS
John Deere 300 Spin Spreader; Operator's Manual OM-M19115M; pages 16 & 24.

Primary Examiner—M. Henson Wood, Jr.
Assistant Examiner—Andres Kashnikow
Attorney, Agent, or Firm—Thomas J. Clough

[57] ABSTRACT

Apparatus for distributing particulate material over a zone. A supply hopper for the particulate material has adjacent its outlet a conical distributor element which is coupled to a variable speed motor. The conical distributor element has on its sloped surface a plurality of fins and preferably a plurality of slots. Some particulate from the supply hopper passes through the slots, if present, to the area of the distribution zone beneath the distributor element. Some particulate material strikes the conical surface and is deflected radially therefrom. Some of the particulate material is struck by the fins as the distributor element rotates and is deflected tangentially. The apparatus is particularly suited for charging a catalytic reactor with catalyst.

9 Claims, 6 Drawing Figures

FIG. 2.
FIG. 3.
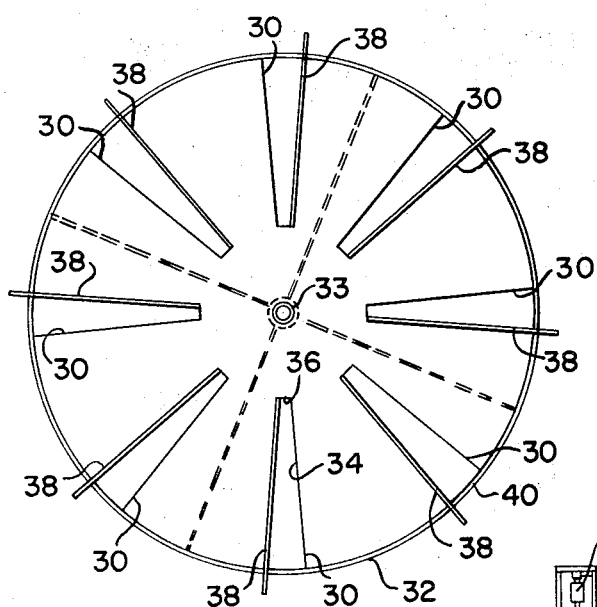
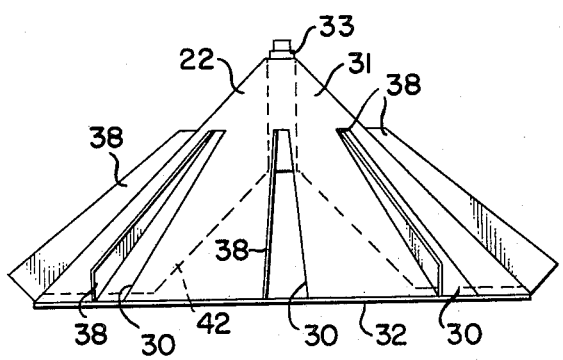
FIG. 4.
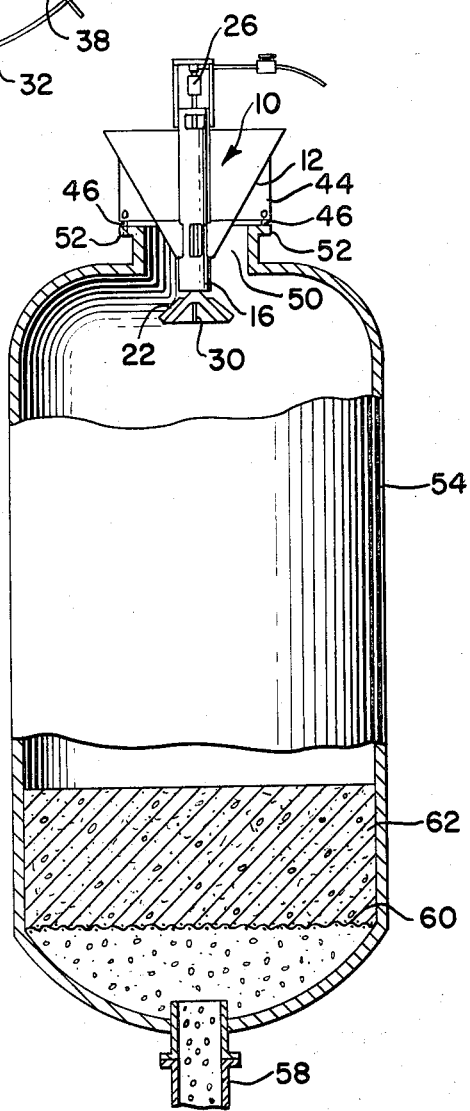

CATALYST DISTRIBUTION APPARATUS

The present invention pertains to a particle distributor. More particularly the present invention pertains to an apparatus for distributing particulate material, such as a catalyst, over a zone, such as a catalytic reactor.

Chemical reactions are frequently caused to take place within a reactor filled with a catalyst material. By way of example, gases can be caused to flow through a bed of catalyst material to react, with the resulting product gases drawn off. Optimal operation of such a reactor requires that the catalyst material be spread substantially uniformly across the reaction zone. Such catalytic reactors are generally of a fairly large size, for example having a circular cross-section with a diameter of from about 1 foot to about 15 feet and a height from about 5 feet to about 125 feet. For best operation, the catalyst must be spread within the reactor with a substantially uniform depth and with a substantially uniform compactness.

In the past, catalyst has been charged to a reactor by what is commonly referred to as the "sock" method. In this method, a hopper having an attached hose which extends to the bottom of the reactor or catalyst surface is utilized. The hopper and hose are charged with catalyst, and the catalyst is released at the bottom of the hose while the hose is slowly raised. The resulting catalyst bed develops a cone which, during the loading of the catalyst, can be distributed over the catalyst bed by raking.

One of the problems that is associated with loading reactors by this method is that the catalyst bed sometimes includes catalyst voids which, during the subsequent catalytic reaction process, often bring about localized hot spots during the exothermic reactions of reactants, thereby producing undesirable side reactions and products. In addition, the sock technique requires considerable time for loading the catalyst into the reactor, since the hose through which the catalyst enters the reactor has to be continually adjusted upwardly in order to allow catalyst to flow.

A further problem results from settling of catalyst which changes the overall volume of the catalyst bed, thereby producing damage to equipment such as thermowells which have been inserted into the reactor for temperature measurements. The settling of catalyst also can lower the surface of the catalyst bed to a level at which the thermowell is not in contact with the catalyst, thereby not allowing the reaction temperature to be monitored during the course of a reaction.

The present invention is an apparatus for distributing particulate solid material within a zone which is particularly suited for distributing catalyst within a reactor.

In accordance with the present invention, a supply hopper is provided, having adjacent its outlet a conical distributor element which is coupled to a variable speed drive motor. The distributor element is conical and has a plurality of fins in its sloped surface and preferably also a plurality of slots extending substantially vertically upward from the sloped surface. As particulate material from the supply hopper falls, some of the particulate material passes through the slots, if present, to the area generally beneath the distributor element, while other of the particulate material strikes the rotating distributor element which imparts a radially horizontal component to the motion of the falling catalyst. Still other of the particulate material is struck by a fin which imparts a tangentially horizontal component. The size of the slots and fins on the distributor element, the overall size and angle of that conical distributor element, and the speed of rotation are selected in accordance with the particulate size and the size of the zone within which the particulate material is to be spread. As a consequence, the particulate material is spread substantially uniformly over the zone. The apparatus of the present invention is particularly useful in carrying out the process set forth in U.S. Pat. No. 3,668,115.

These and other aspects and advantages of the present invention are more apparent in the following detailed description and claims, particularly when considered in conjunction with the accompanying drawings in which like parts bear like reference numerals. In the drawings:

FIG. 2 is a plan view of the distributor element of the particulate distributor depicted in FIG. 1 and is taken along line 2—2 of FIG. 1;

FIG. 3 is an elevational view of the distributor element of FIG. 2;

FIG. 4 is a sectional view illustrating utilization of a particulate distributor in accordance with the present invention to distribute catalyst material within a catalytic reactor.

Figure 1:
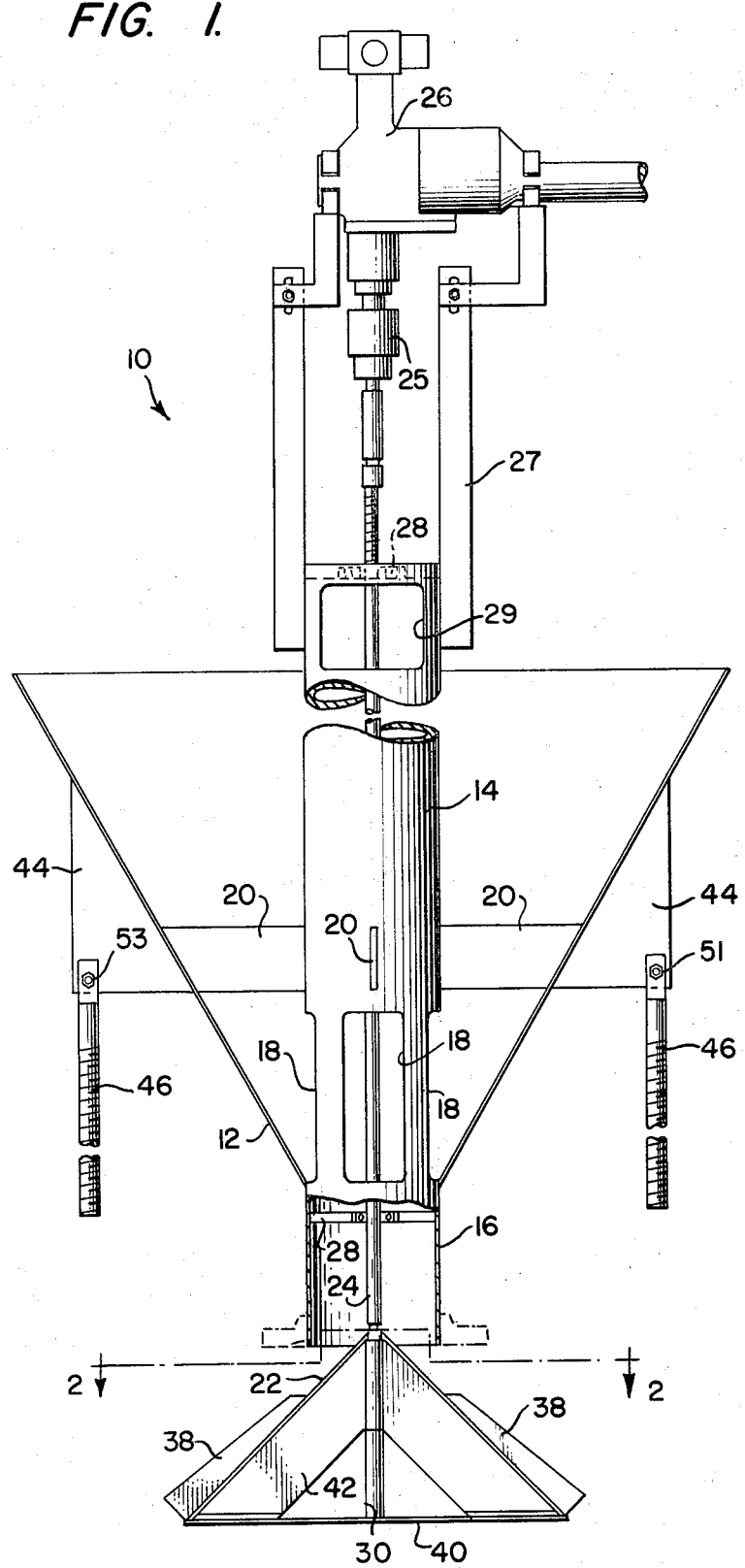
FIG. 1 is a partially broken, sectional elevational view of a particulate distributor in accordance with the present invention.

Particulate distributor 10 depicted in FIG. 1 includes supply hopper 12 which, for example, can be made of a sheet metal and can have a substantially frustoconical shape, being larger at the upper end. A vertical pipe 14 extends centrally within supply hopper 12 and passes through the hopper outlet to form discharge pipe 16. Within the lower portion of hopper 12 a plurality of openings 18 are formed in pipe 14 to provide communication from supply hopper 12 to discharge pipe 16. Preferably a plurality of supports 20 are provided to brace pipe 14 within hopper 12. The hopper 12 can be made of any desired capacity or can have removable extensions for its sides to increase its capacity. The upper end of the hopper 12 can have a square cross-section or a circular cross-section. The capacity extension for the hopper can be mounted vertically or tangentially.

Conical distributor element 22 is provided beneath the outlet of discharge pipe 16 with the cone apex adjacent discharge pipe 16. Distributor element 16 is coupled by shaft 24, which extends within pipe 14, to variable speed motor 26 which is supported above pipe 14 by mounting members 27. By way of example, motor 26 can be a variable speed electric motor or pneumatic motor. Shaft 24 is journaled within pipes 14 and 16 by bearing assemblies 28 which permit rotation of shaft 24 within pipes 14 and 16 and which permit longitudinal movement of shaft 24 within bearing assemblies 28. Access to lower bearing assembly may be available through openings 18 and to upper bearing assembly 28 through openings 29 in pipe 14.

As seen in FIGS. 2 and 3, distributor element 22 has a substantially conical configuration with a plurality of slots 30 extending on the cone sloped surface 31 from the cone lower edge 32 a substantial distance toward the cone apex 33. Each slot 30 can be formed by a first cut 34 extending substantially radially on sloped surface 31, as seen particularly in FIG. 2, and a second cut 36 extending substantially circularly. The resulting fin 38 is folded outwardly to extend from the exterior conical surface 31 in a substantially vertical orientation. Alternatively, the material from the slots 30 can be completely removed and fins of other sizes attached to sloped surface 31. Preferably distributor element 22 is reinforced, for example by means of a wire or rod 40 extending around its lower periphery 32 and by means of one or more ribs 42.

Preferably, motor 26 is connected to rotatable shaft 24 by means permitting longitudinal adjustment of shaft 24 relative to motor 26 and thus adjustment of the distance at which distributor element 22 is positioned from the outlet of discharge pipe 16. This permits a degree of control of the area over which the particulate material is distributed. By way of example shaft 24 can mate with chuck 25 on motor 26 by means of a keyed spline permitting relative longitudinal movement between motor 26 and shaft 24 but requiring shaft 24 to rotate with motor 26.

FIG. 4 illustrates operation of a particulate material distributor to distribute catalyst in a catalytic reactor in accordance with the present invention. Particulate distributor 10 is positioned to discharge catalyst through catalyst inlet 50 in the upper surface 52 of catalytic reactor 54. For this purpose particulate distributor 10 is provided with a plurality of support flanges 44 each of which may be equipped with a mounting bolt 46 to mount particulate distributor 10 to upper surface 52. Support flanges 44 also can be set directly on upper surface 52 with shims utilized to level hopper 12. As seen in FIG. 1, bolts 46 are connected to flanges 44 by means such as bolts 51 and nuts 53. Catalytic reactor 54 is of a standard configuration, having a fluid inlet in its upper area and a fluid outlet 58 from its lower area. Reactor 54 for example can include a support screen 60 to support catalyst material 62 a short distance above the lower surface of the reactor. Consequently, fluid entering through the fluid inlet passes through catalyst material 62 over substantially the entire cross-section of reactor 54 so that there is little or no dead zone within the catalyst bed.

To charge reactor 54 with catalyst by means of particulate distributor 10, a quantity of the catalyst material is provided to supply hopper 12, and motor 26 is activated to rotate distributor element 22. Catalyst falls from supply hopper 12 through discharge pipe 16 which defines an initial discharge path directing the catalyst material onto distributor element 22. Some of this catalyst passes through slots 30 to the central area of support screen 60 and the catalyst bed. Other of the catalyst strikes the conical surface of distributor element 22 and slides in a radial path from the conical distributor element. Still other catalyst is struck by the fins 38 which impart a tangential component to its movement. Accordingly, catalyst material is distributed substantially uniformly across the cross-section of reactor 54. The distribution of catalyst can be controlled by controlling the speed of rotation of distributor element 22 and the height of the distributor element above the catalyst bed. If desired, discharge pipe 16 and shaft 24 can incorporate one or more detachable extensions to permit positioning of distributor element 22 further within reactor 54, for example in the event the reactor inlet includes a long neck.

With the apparatus of the present invention, catalyst can be charged to a reactor in downflow relationship to said reactor. In general, reactor sizes varying between about 1 to about 15 feet, preferably from about 3 to about 13 feet in diameter, and from about 5 to about 125 feet, more preferably from about 10 to about 70 feet in length can be charged by the apparatus of the present invention. The catalyst is preferably charged to the reactor at a rate of fill of the reactor of up to about 17 vertical inches per minute, more preferably from about 1 to about 6 and still more preferably from about 2 to about 4 inches per minute. The rate of fill of the reactor can be non-uniform, that is, the rate of fill can vary within the above range. It is preferred, however, that the rate of fill be uniform and that after a given rate of fill is established, that this rate of fill be maintained while preparing the catalyst bed. The catalyst particles are introduced into the reactor at a point such that the distance to the catalyst surface formed as the catalyst particles are introduced through a gaseous medium provides an average free fall distance of catalyst particles of at least about 1 foot, more preferably an average free fall distance of from about 5 to about 125 feet and still more preferably from about 10 to about 70 feet. The gaseous medium in general is air, or depending on the catalyst, an inert medium such as nitrogen. In general the minimum free fall distance provides for a downward velocity sufficient to orient the catalyst particle along the major axis of the catalyst particle, that is the free fall distance should be sufficient to provide for the catalyst particle to move a slight vertical distance upwardly after contact with the catalyst surface in order to accomplish the orientation. Thus, in general, the catalyst particles fall individually to the catalyst surface as the catalyst bed is formed. The orientation of the catalyst particle produced in this manner provides for the substantially horizontal orientation of the catalyst particles on an average basis in that the most probable orientation of the longitudinal axis of catalyst particles is horizontal. In addition, catalyst particles having a substantially horizontal orientation are defined herein to provide a catalyst surface which has a difference between the highest portion of the catalyst surface and the lowest portion of the catalyst surface which is less than 10 percent of the diameter of the catalyst bed, that is a substantially flat surface more preferably less than 5 percent and still more preferably less than 1 percent.

Figure 5:
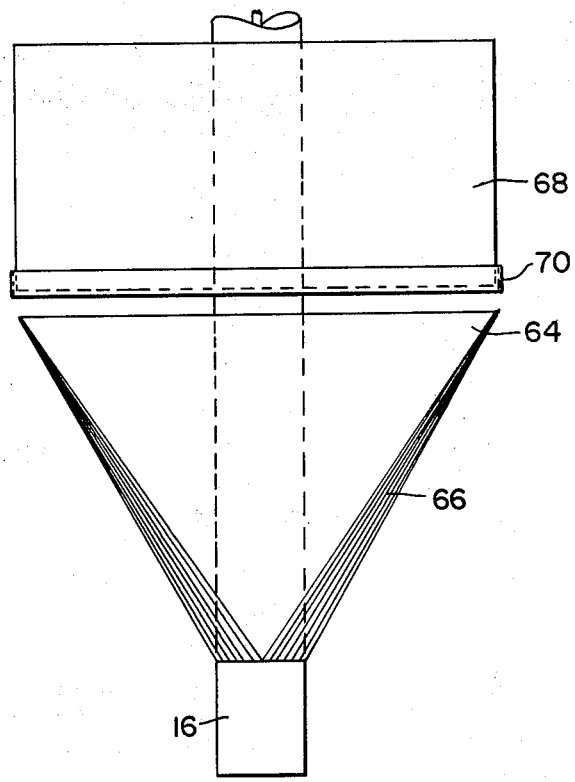
FIGS. 5 and 6 are a side elevational view and a top plan view, respectively, of an alternative embodiment of a particulate distributor in accordance with the present invention.
Figure 6:
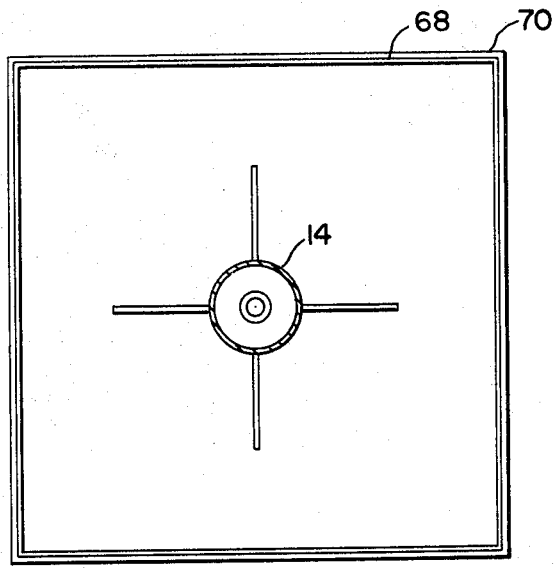

Preferably supply hopper 12 can hold a substantial quantity of particulate material. Such material frequently comes in supply drums, and preferably supply hopper 12 can hold at least one drum of particulate material. Extensions can be added to the sides of supply hopper 12 to increase its capacity while still permitting ready transport and storage. The use of such extensions is facilitated if the upper end of supply hopper 12 has a square cross-section, rather than a circular cross-section. FIGS. 5 and 6 illustrate such a supply hopper 64 with sidewall 66 of a circular cross-section at its lower end to mate with discharge pipe 16 and of a square cross-section at its upper end. Extension 68 is formed with lip 70 to mate with the square upper end of hopper 64.

As a specific example, a particulate distributor in accordance with the present invention can be provided with supply hopper 66 having at its upper end a square cross-section, with each side in the order of three feet, and at its lower end a circular cross-section, with a diameter in the order of 6 inches to join discharge pipe 16. The sides of such hopper 66 are inclined at an angle in the order of 30°. Four openings 18 are provided, spaced 90° apart about the lower portion of pipe 14, with each opening 18 having a width in the order of 3 inches and a length in the order of 8 inches. Distributor element 22 can be a cone having its sides inclined at an angle in the order of 45°, with base 32 having a diameter in the order of about 12 to 24 inches. Eight slots 30 and fins 38 can be provided at 45° intervals about distributor element 22, each slot and fin extending in the order of about 4 to 20 inches up the inclined side of element 22 and having a width in the order of 1½ inches at base 32. Such a particulate distributor can readily distribute over a zone with a radius in the order of about 3 to 9 feet a particulate material such as a macrosize catalyst having a diameter in the range of from about one sixty-fourth inch to about one fourth inch and a length in the range of from about one thirty-second inch to about one half inch.

It is thus seen that a particulate distributor in accordance with the present invention is capable of providing substantially uniform distribution of particulate material over an area. If it is desired to distribute the particulate material over an annular area, for example in the distribution of catalyst within a radial catalytic reactor, slots 30 are eliminated so that as the distributor element rotates the catalyst material is distributed solely by the action of fins extending outwardly from the distributor element, in the manner of fins 38, and by the inclined surface of the distributor element.

Although the present invention has been disclosed with reference to preferred embodiments, numerous modifications and rearrangements could be made, and still the result would be within the scope of the invention.

What is claimed is:

1. In a catalytic reactor having an apparatus positioned on said reactor to distribute catalyst in downflow relationship to said reactor, the improvement comprising an apparatus which comprises:
    a supply hopper, having an inlet and an outlet, for holding particulate material;
    a rotatable shaft adapted for connection to a motor to be rotated thereby;
    a variable speed motor connected to said rotatable shaft; and
    a distributor element supported by said shaft for rotation therewith adjacent said supply hopper outlet so that particulate material leaving said supply hopper outlet strikes said distributor element, said distributor element having a substantially conical configuration with the cone apex adjacent said supply hopper outlet and having a plurality of vertically disposed deflection fins extending radially on the exterior sloped surface of the cone;
    whereby as said distributor element is rotated a portion of particulate material leaving said supply hopper outlet strikes the exterior sloped surface of said conical distributor element to be deflected radially therefrom and a portion of particulate material leaving said supply hopper is struck by said deflection fins to be deflected tangentially thereby.

2. Apparatus as claimed in claim 1 in which said distributor element exterior sloped surface includes a plurality of slots therethrough.

3. Apparatus as claimed in claim 2 in which the slots extend radially on the exterior sloped surface of the cone.

4. Apparatus as claimed in claim 3 in which the slots are substantially coextensive with said deflection fins.

5. Apparatus as claimed in claim 1 further comprising a discharge pipe coupled to said supply hopper outlet and providing an initial discharge path directing particulate material leaving said supply hopper outlet onto said distributor element.

6. Apparatus as claimed in claim 1 further comprising means adjustably connecting said motor to said rotatable shaft while permitting adjustment of the position of said rotatable shaft and of said distributor element relative to said supply hopper outlet.

7. Apparatus as claimed in claim 1 in which said supply hopper has an inverted frustoconical configuration.

8. Apparatus as claimed in claim 1 further comprising hopper extension means for increasing the capacity of said supply hopper.

9. Apparatus as claimed in claim 8 in which said supply hopper has an inverted frustoconical configuration modified to include a substantial circular cross-section at the smaller end and a substantially square cross-section at the larger end and in which said hopper extension has a substantially square cross-section mating with the substantially square cross-section of said supply hopper larger end.

* * * * *